United States Patent [19]

Kokubo et al.

[11] Patent Number: 4,747,001

[45] Date of Patent: May 24, 1988

[54] DISK CARTRIDGE AND DEVICE FOR DRIVING THE SAME

[75] Inventors: Noriyoshi Kokubo, Ebina; Yoshitaka Iwabuchi, Yamato; Yoshimasa Fujimoto, Sagamihara; Shohji Morioka, Maebashi, all of Japan

[73] Assignee: Victor Company of Japan, Limited, Kanagawa, Japan

[21] Appl. No.: 882,664

[22] Filed: Jul. 7, 1986

[30] Foreign Application Priority Data

Jul. 11, 1985 [JP] Japan .................................. 60-153049

[51] Int. Cl.⁴ .............................................. G11B 23/02
[52] U.S. Cl. ....................................... 360/97; 360/94; 360/99; 360/133
[58] Field of Search ..................................... 360/97–99, 360/133, 94

[56] References Cited

U.S. PATENT DOCUMENTS

| | | | |
|---|---|---|---|
| 3,931,644 | 1/1976 | Ward | 360/133 |
| 4,352,132 | 9/1982 | Gyi | 360/97 |
| 4,573,572 | 3/1986 | Kato et al. | 360/133 X |

*Primary Examiner*—John H. Wolff
*Attorney, Agent, or Firm*—Jordan and Hamburg

[57] ABSTRACT

A device which is compatible for selectively loading either a first disk cartridge in which a first disk is encased or a second disk cartridge in which a second disk is encased and wherein the radius of the first disk is different from the radius of the second disk, the first cartridge having a first width extending over substantially the whole length of the first cartridge in the intended direction of cartridge insertion, the second cartridge consisting of a front portion having a width equal to the first width and a rear portion having a width greater than the first width, the device including a chassis and a cartridge guiding and loading apparatus supported by the chassis for selectively loading either the first cartridge or the second cartridge, the cartridge guiding and loading apparatus including guides for guiding either the first or the second cartridge as the first or second cartridge is selectively loaded into the device, the guides being moveable between first and second positions such that when in the first position, the guides engage and guide the first cartridge and the front portion of the second cartridge during the selective loading and when in the second position, the guides guide the rear portion of the seocnd cartridge during loading of the second cartridge.

17 Claims, 4 Drawing Sheets

DISK CARTRIDGE AND DEVICE FOR DRIVING THE SAME

BACKGROUND OF THE INVENTION

The present invention relates to a disk cartridge for receiving a floppy disk or like flexible magnetic disk therein and a device for driving the disk in a rotational motion so that a magnetic head may write and read information into and out of the disk by scanning it in a radial direction.

A disk driving device of the type described is extensively used with a terminal equipment of a computer. The problem with a prior art disk driving device is that it is constructed and arranged to handle only particular cartridges in which disks of one predetermined size are received i.e., it does not allow other cartridges in which disks similar in size to the above-mentioned ones are encased to be loaded. Consequently, it is extremely difficult to increase the area of a disk and, therefore, an amount of information which can be recorded therein since the disk size which can be accommodated is only one.

SUMMARY OF THE INVENTION

It is therefore an object of the present invention to provide a disk cartridge driving device which allows the use of disks greater in size than those which are received in prior art cartridges while preserving compatibility with the prior art cartridges.

It is another object of the present invention to provide a disk cartridge which is greater in the diameter of a disk encased therein and, therefore, in the storage capacity than a prior art one.

It is another object of the present invention to provide a generally improved disk cartridge and a device for driving the same.

In accordance with the present invention, there is provided a device for selectively driving in a rotational motion at least a first and a second compatible disk cartridges in which disks of different radii are encased respectively after any of the cartridges has been inserted into the device and causing a magnetic head to scan the disk in a radial direction of the disk to write and read information out of the disk. The first cartridge includes a portion having a first width which extends over substantially the whole length in an intended direction of cartridge insertion. The second cartridge consists of a front portion having the first width and a rear portion having a second width which is different from the first width. The device comprises a chassis, and a cartridge guiding and loading mechanism supported by the chassis for, when any of the first and second cartridges is inserted into the device, lodging the cartridge in the device while guiding the cartridge correspondingly to the width or widths of the cartridge.

In accordance with the present invention, in disk cartridge having a cartridge body constituted by a pair of cartridge halves which are combined to define a flat space therebetween for receiving a disk, which is driven by a disk driving device in a rotational motion to allow a magnetic head to write and read information out of the disk, the cartridge body comprises a front portion having a first width with respect to an intended direction of cartridge insertion into the device, a rear portion having a second width which is different from the first width, and an intermediate portion joining the first and second portion to each other.

The above and other objects, features and advantages of the present invention will become more apparent from the following detailed description taken with the accompanying drawings.

DESCRIPTION OF THE PREFERRED EMBODIMENTS

Figure 1:
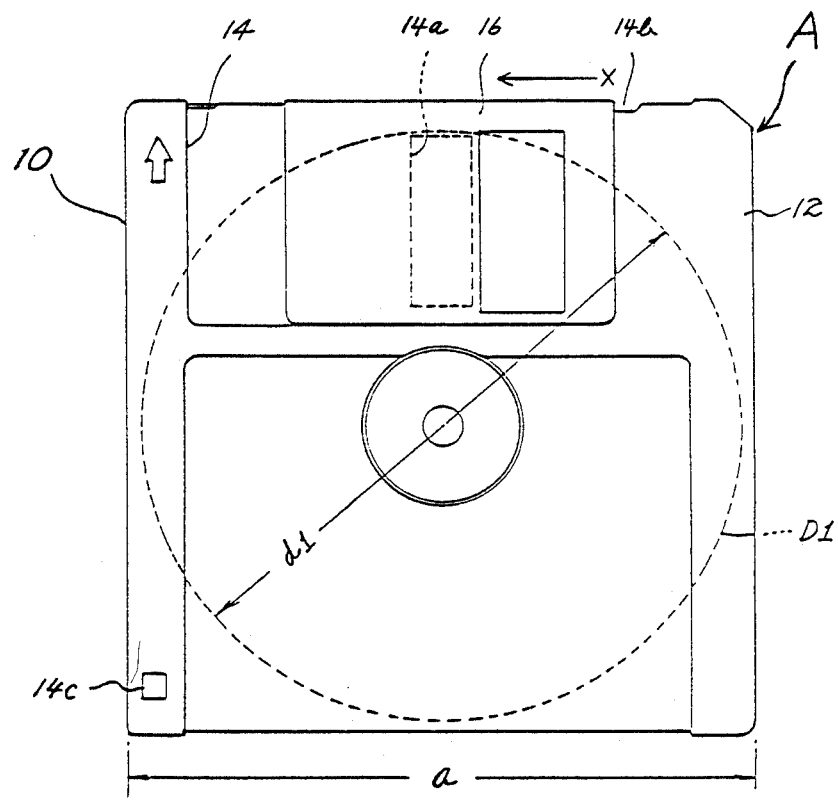
FIG. 1 is a plan view of a prior art disk cartridge.

To better understand the present invention, a brief reference will be made to a typical example of prior art disk cartridges, shown in FIG. 1. The cartridge, generally A, has thereinside a floppy disk or like magnetic recording medium and is usable with a disk driving device of the present invention, too. As shown, the cartridge A comprises a body 10 which is constituted by combining two halves 12 each being made of synthetic resin or any other suitable material. A magnetic disk D1 having a predetermined outside diameter $d_1$ (e.g. 86 mm) is received hermetically and rotatably in a flat space defined between the cartridge halves 12.

The body 10 is provided with a rectangular recessed portion 14 adjacent to the front end thereof with respect to an intended direction of cartridge insertion. An elongate window 14a is formed through the recessed portion 14 to allow a magnetic head of a device, which will be described, to scan the disk D1 radially therethrough. A shutter 16 is situated in the recessed portion 14 to be movable in a direction perpendicular to the direction of cartridge insertion for opening and closing the window 14a. While the cartridge A is not used, the shutter 16 is so positioned as to close the slot 14a. The cartridge body 10 is provided with a notch 14b at the front end thereof. When the cartridge body 10 is inserted into the device, a lever (not shown) built in the device locks itself to the notch 14b of the cartridge body 10 and moves the shutter 16 along the recessed potion 14 as indicated by an arrow X, thereby opening the window 14a. Provided in a rear portion of the cartridge body 10 is a sensor window 14c which allows information to be written into the disk D1 when opened and does not do so when closed. The cartridge A is assumed to have a width a.

A data transfer time attainable with a disk driving device adapted to drive the disk cartridge A is limited since disk rotation speed in such a device is as low as 300 to 360 rpm. Assuming a device with a disk rotation speed of 300 rpm and tracks each having a capacity of 4 kB, for example, a time of at least 60/300=0.2 (sec) is necessary for one rotation to be completed, i.e., for 4 kB to be read out. One possible approach for a higher data transfer rate is increasing the rotation speed of a spindle.

Data transfer times derived from N-foil rotation speeds may be compared as follows. For the convenience of description, assume that the amount of data to be transmitted is 100 kB, the capacity per track is 4 kB, the average seek time is 110 msec, and the rotation speed is 300 rpm. Let $T_N$ be the necessary time.

(1) Where the average seek time is shorter than the time necessary for one rotation, then $T_N$=(number of necessary tracks×2)×time per rotation The number of necessary tracks is 100/4=25 and the time per rotation is 60/300=0.2 (sec). Assuming that N=1, then 300 rpm: $T_1 = (25 \times 2) \times 0.2 = 10$ (sec)

(2) Where the average seek time is longer than the time necessary for one rotation, then $T_N$=(necessary number of tracks×3)×time per rotation Assuming N=2, 600 rpm: $T_2 = (25 \times 3) \times 0.1 = 7.5$ (sec)

Assuming N=3, 900 rpm: $T_3 = (25 \times 3) \times 0.67 = 5$ (sec)

Further, assuming N=4

1200 rpm: $T_4 = (25 \times 3) \times 0.5 = 3.75$ (sec)

The above analysis teaches that if N is equal to or greater than 3 the data transfer time is reduced to less than a half, thereby offering a significant effect.

It follows that increasing the spindle rotation speed and the disk diameter makes it possible to decrease the data transfer time and increase the storage capacity. However, it is impractical with a prior art disk driving device which cannot cope with disks, or cartridges, except for a one having a predetermined size to increase the storage capacity of a disk.

Hereinafter will be described preferred embodiments of the present invention which settle the problematic situation as discussed above.

Figure 2:
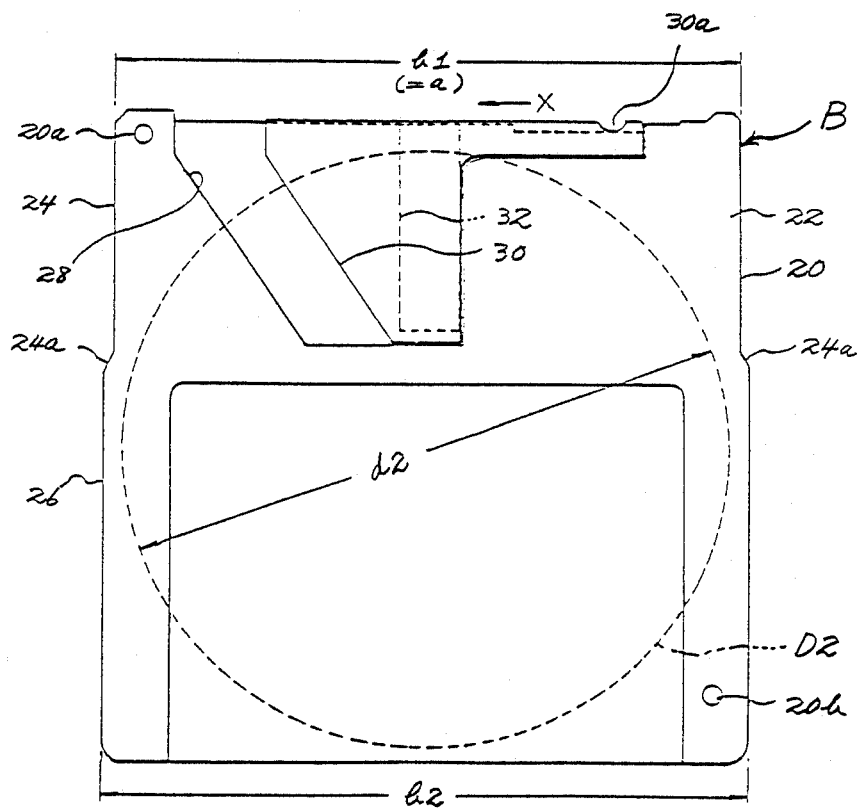
FIG. 2 is a plan view of a disk cartridge in accordance with the present invention.

Referring to FIG. 2, a disk cartridge in accordance with the present invention is shown. The cartridge B, like the prior art cartridge A of FIG. 1, comprises two halves 22 which are made of synthetic resin or like material and put together to constitute a cartridge body 20. A magnetic disk D2 having a predetermined outside diameter $d_2$ (e.g. 89 mm) is received hermetically and rotatably in a flat space defined between the cartridge halves 22. The cartridge body 20 consists of two different portions: a first portion 24 adjacent to the front end of the body 20 with respect to an intended direction of cartridge insertion and extending over a predetermined length with a width $b_1$ which is equal to the width a of the prior art cartridge A, and a second portion 26 contiguous with and extending rearwardly from the first portion 24 with a width $b_2$ which is wide enough to accommodate the disk D2.

The first body portion 24 includes a recessed portion 28 adapted to guide a shutter 30, and an elongate window 32 serving to allow a magnetic head of a device, which will be described, to scan the disk D2 radially therethrough. The shutter 30 is movable within the recessed portion 28 in the direction X to open the window 32, so that information may be written into the disk D2. The shutter 30 is formed with a notch 30a at the front edge thereof and in a position which corresponds to that of the notch 14a of the prior art cartridge A. When the cartridge B is loaded in the device, a lever built in the device locks itself to the notch 30a of the shutter 30 and thereby moves the shutter 30 along the recessed portion 28 in the direction X to uncover the window 32. The cartridge body 20 is provided with an aperture 20a in order to discriminate the cartridge B having the wider second section 26 from the prior art cartridge A. Further, the cartridge body 20 is provided with a sensor window 20b in a rear portion thereof which is different in position from the sensor window 14c of the cartridge A. the sensor window 20b permits write-in when opened and inhibits it when closed.

Figure 3:
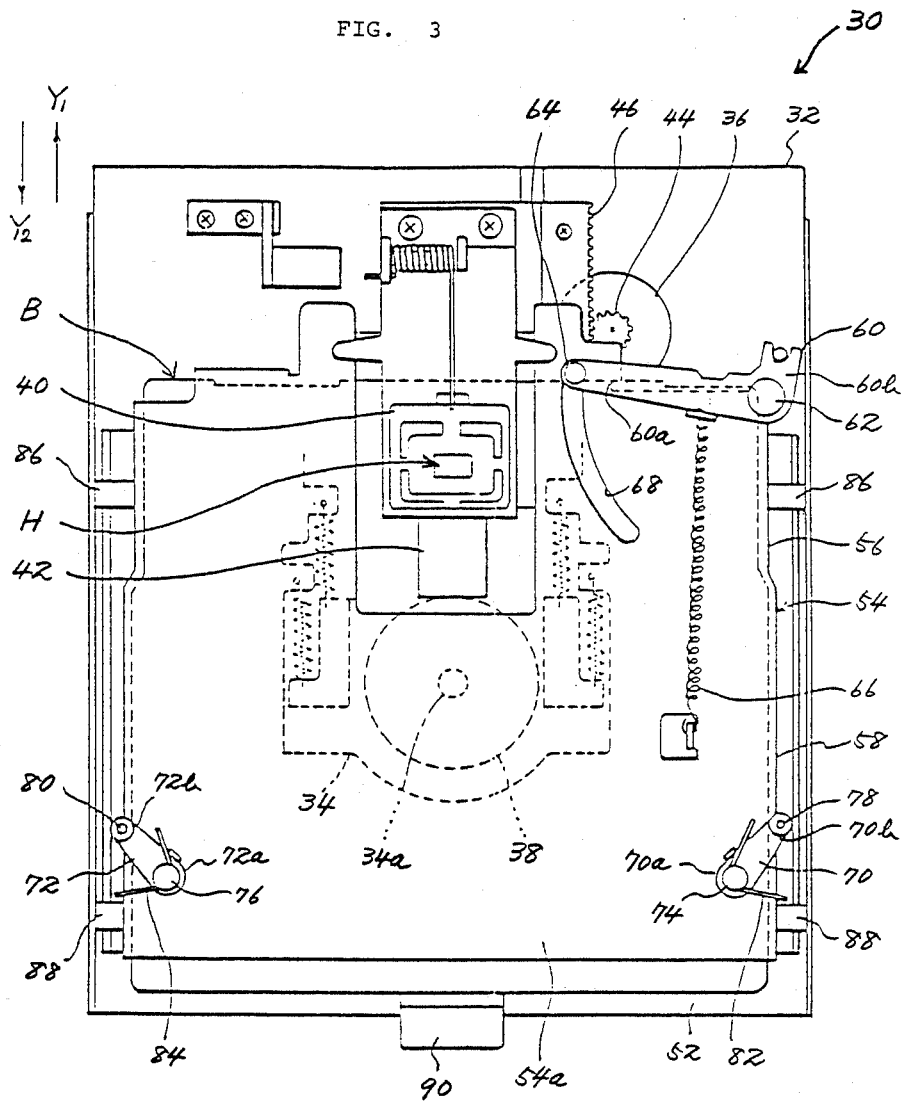
FIG. 3 is a schematic plan view of a disk cartridge driving device embodying the present invention.
Figure 4:
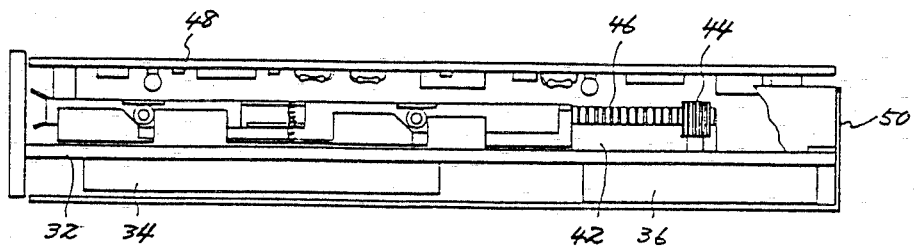
FIG. 4 is a side elevation of the device as shown in FIG. 3.

Referring to FIGS. 3 and 4, a disk driving device embodying the present invention is shown and generally designated by the reference numeral 30. As shown, the device 30 includes a chassis 32 on the underside of which a spindle motor 34 whose rotation speed is 1200 rpm, for example, and a stepping motor 36 for linearly driving a magnetic head H are mounted. A hub support 38 is press-fitted on an output shaft 34a of the spindle motor 34. The head H is mounted resiliently on a carriage 42 by a gimbal mechanism 40 which is well known in the art. As the stepping motor 36 is rotated, a pinion 44 mounted on an output shaft of the motor 36 drives a rack 46 which is meshed with the pinion 44 along a linear path as indicated by arrows $Y_1$ and $Y_2$, allowing the head H to scan the disk which is encased in the cartridge 42. An iron-based printed circuit board 48 which is loaded with various circuit parts is disposed above the chassis 50 in such a manner as to hermetically cover the top of a housing 50 of the device 30.

The device 30 is provided with an opening 52 for the ingress and egress of a cartridge. Defined inwardly of the opening 52 is a cartridge loading section 54. This section 54 consists of a first guide portion 56 and a second guide portion 58 which are adapted to guide respectively the first and the second portions 24 and 26 of the cartridge B of FIG. 2 and, accordingly, provided with widths which correspond respectively to the widths $b_1$ and $b_2$. The section 54 includes a top wall member 54a, and an arm 60 which is mounted to the member 54a adjacent to the front edge of the latter with respect to the directon of cartridge insertion. Specifically, the arm 60 is pivotted to a shaft 62 at one end, or base end, 60b and provided with a locking portion 64 at the other end. As the cartridge B is inserted into the section 54 and moved deeper into the device 30 in the direction $Y_1$, the notch 30a of the shutter 30 is brought into engagement with the locking portion 64 of the arm 60 with the result that the arm 60 is rotated clockwise about the shaft 62 against the action of a coiled spring 66. This causes the locking portion 64 of the arm 60 to move upwardly as viewed in FIG. 3 along an arcuate slot 68. In the meantime, the shutter 30 is moved in the recessed portion 28 in the direction X to uncover the window 32, thereby allowing the head H to track the disk.

A pair of guide arms 70 and 72 are mounted on the top wall member 54a adjacent to the opening 52. The guide arm 70 is pivotted to a shaft 74 at one end 70a, and the guide arm 72 to a shaft 76 at one end 72a. Rollers 78 and 80 are respectively mounted on the other ends, or guide ends, 70b and 72b of the arms 70 and 72 in such a manner as to be movable into the second guide portion 58. The arms 70 and 72 are respectively biased by torsion springs 82 and 84 toward the interior of the guide portion 58. However, the angular positions of the arms 70 and 72 are restricted such that usually their associated rollers 78 and 80 remain stationary at positions which correspond to the width $b_1$ of the first portion 24 of the cartridge B. In this construction, when the cartridge B having the configuration as shown in FIG. 2 is inserted into the loading section 54, the first portion 24 is guided by the rollers 78 and 80 without moving the latter. As soon as the first portion 24 moves past the second guide portion 58 to reach the first guide portion 56 whose width corresponds to the width $b_1$, the wider second portion 26 forcibly moves the roller 78 and 80 to thereby rotate the arms 70 and 72 outwardly about their associated shafts 74 and 76. Eventually, the second portion 26 is accurately guided into the second guide portion 58.

After the cartridge B has been fully lodged in the loading section 54, the loading section 54 is bodily lowered together with the cartridge B guided by guide pins 86 and 88, until the disk D2 rests on the hub support 38. Then, the device 30 determines the kind of the cartridge B loaded so by sensing the notch 20a of the cartridge B and controls various driving systems in conformity to the particular kind of the cartridge B. Timed to the cartridge loading operation, the notch 30a of the shutter 30 mates with the locking portion 64 of the arm 60 with the result that the shutter 30 is urged in the direction X to open the window 32 of the cartridge body 20. In this condition, the head H is allowed to scan the disk D2 radially through the window 32 so as to write or read information into or out of the disk D2, which may be rotated at a speed of 1200 rpm by way of example. The reference numeral 90 designates an eject lever which may be manipulated to unload a cartridge.

Assume that the comparatively narrow cartridge A as shown in FIG. 1 is inserted into the loading section of the device 30. In this case, the rollers 78 and 80 on the guide ends 70b and 72b of the guide arms 70 and 72 guide the cartridge A toward the deepest point of the loading section 54 without being moved forcibly by the cartridge A, that is, remaining in the restricted positions. In the meantime, as during the insertion of the cartridge B, the locking portion 64 of the arm 60 is rotated by the cartridge A in engagement with the edge of the shutter 16, opening the window 14a of the cartridge A. In this condition, the disk D1 on which information was recorded at a speed of 300 rpm, for example, may be rotated at a higher speed of 1200 rpm to only read out the information.

As described above, in accordance with the present invention, the cartridge A having a smaller diameter and designed to write and read information at, for example, a speed of 300 rpm can be positively loaded in the device 30 and allows the information stored therein to be transferred at a high rate. Furthermore, even the cartridge B having the disk D2 which is greater in radius than the disk D1 of the cartridge A can be loaded in the device 30 and allows information to be written and read thereoutof, fulfilling the demand for a greater storage capacity.

Figure 5:
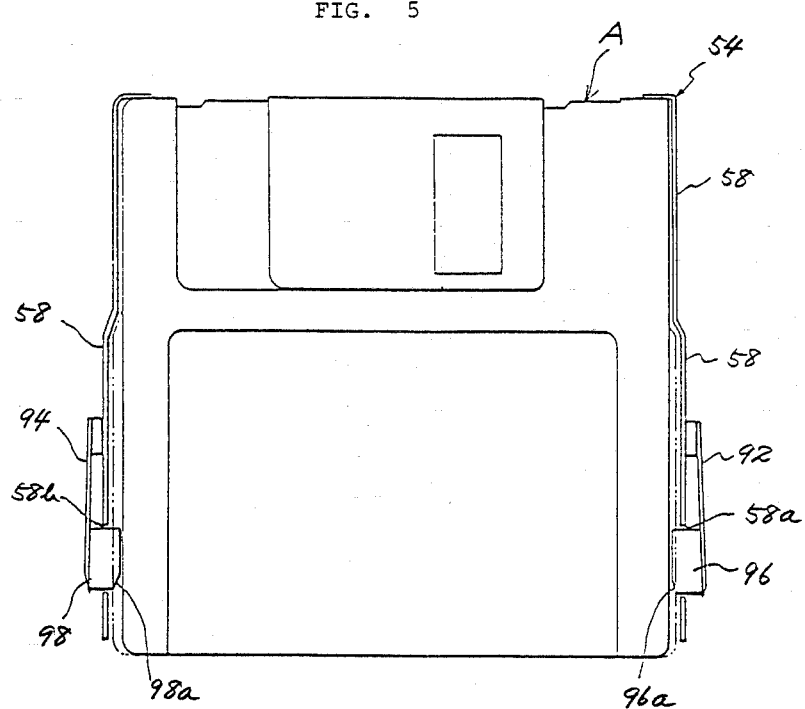
FIG. 5 is a plan view of a cartridge loading section representative of another embodiment of the present invention.

Referring to FIG. 5, another specific construction of the cartridge loading section 54 representative of another embodiment of the present invention is shown. In this particular embodiment, the wider second guide portion 58 of the loading section 54 is provided with openings 58a and 58b while guide members 96 and 98 are installed in place of the rollers 78 and 80 of FIG. 3. Specifically, the guide members 96 and 98 are respectively mounted through leaf springs 92 and 94 to the loading section 54 and movable back and forth in the openings 58a and 58b. The guide members 96 and 98 are respectively provided with surfaces 96a and 98a which taper in the direction of cartridge insertion. In this construction, when the prior art cartridge of FIG. 1 is inserted into the loading section 54, it is guided by the guide members 96 and 98 to the deepest point of the loading section 54 without urging them. On the other hand, when the cartridge B of FIG. 2 is inserted into the loading section 54, the wider second portion 26 of the cartridge B urges the guide members 96 and 98 outwardly against the action of their associated leaf springs 92 and 94. Cooperating with the second guide portion 58, the guide members 96 and 98 guide the second portion 26 of the cartridge B from opposite sides, ensuring accurate insertion of the second portion 26.

Figure 6:
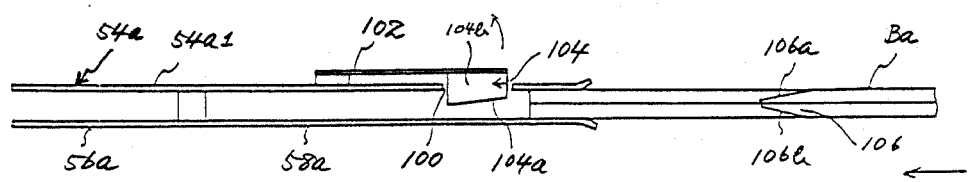
FIG. 6 is a side elevation of a cartridge loading section representative of still another embodiment of the present invention.

Referring to FIG. 6, another specific construction of the loading section representative of still another embodiment of the present invention is shown. The loading section, generally 54a, includes a wider second guide portion 58a which is provided with a pair of openings 100. The openings 100 each extends from a top wall member 54a, of the loading section 54a to one of opposite side wall members in such a manner as to face the other. A leaf spring 102 is fixed at one end to the top wall member $54a_1$ and a guide member 104 having a tapered surface 104a and side surface 104b is mounted at the other end. The guide member 104 is received in each of the openings 100 to be movable up and down substantially perpendicularly to the top wall member $54a_1$. The amount of penetration of the guide member 104 into the second guide portion 58a is suitably determined to match it to the thickness of the prior art cartridge A.

As the cartridge A of FIG. 1 is inserted into the cartridge loading section 54a, it is accurately guided by the side surface 104b of the guide member 104 into the loading section 54a without moving it. Meanwhile, as the cartridge B of FIG. 2 is inserted into the loading section 54a, it urges the guide member 104 upwardly out of the opening 100 due to sliding contact of a tapered surface 104a of the member 104 and a pair of tapered surfaces 106a and 106b which are provided on the upper and lower surfaces of a tapered portion 106 of a cartridge Ba. As a result, the cartridge Ba with the wider second portion is surely lodged in the loading section 54a.

The tapered surfaces 106a and 106b of the cartridge Ba serve to facilitate insertion of the cartridge Ba while preventing the cartridge Ba from being blocked by the guide member 104. In this particular embodiment, that part of the guide member 104 which is located on the cartridge inlet side may be provided with an arcutate configuration in order to allow the cartridge B without the tapered surfaces 106a and 106b as shown in FIG. 2 to be inserted into the loading section 54a.

In summary, it will be seen that in accordance with the present invention a disk having a larger radius than a one which is encased in a prior art cartridge can be driven without loosing compatibility with the latter. This contributes a great deal to the increase in storage capacity.

Various modifications will become possible for those skilled in the art after receiving the teachings of the present disclosure without departing from the scope thereof.

What is claimed is:

1. A device which is compatible for selectively loading either a first disk cartridge in which a first disk is encased or a second disk cartridge in which a second disk is encased and wherein the radius of said first disk is different from the radius of said second disk, said first cartridge having a first width extending over substantially the whole length of the first cartridge in the intended direction of cartridge insertion, said second cartridge consisting of a front portion having a width equal to said first width and a rear portion having a width greater than said first width, said device comprising:
chassis means; and
cartridge guiding and loading means supported by said chassis means for selectively loading either said first cartridge or said second cartridge, said cartridge guiding and loading means comprising guide means for guiding either said first or said second cartridge as said first or second cartridge is selectively loaded into the device, said guide means being moveable between first and second positions such that when in said first position, said guide means guides said first cartridge and said front portion of said second cartridge during said selective loading and when in said second position, said guide means guides said rear portion of said second cartridge during loading of said second cartridge.

2. A device according to claim 1, wherein said guide means comprise engageable means and biasing means which bias said engageable means into biasing engagement with said first and second cartridges as the latter are selectively loaded.

3. A device according to claim 2, wherein said biasing means comprises resilient springs.

4. A device according to claim 2, wherein said first cartridge has side edges extending in the direction of cartridge insertion, said front and rear portions of said second cartridge having respective front and rear side edge sections extending in the direction of cartridge insertion and an intermediate side edge section between the respective front and rear side edge sections, said intermediate side edge section extending at an acute angle relative to said front and rear side edge sections, said biasing means causing said engageable means to biasingly engage said side edges of said first cartridge and said front, rear, and intermediate side edge sections of said second cartridge during said selective loading.

5. A device according to claim 4, wherein said engageable means is engaged by said intermediate side edge section to provide for biasing movement of said engageable means between said first and second positions as said second cartridge is loaded.

6. A device according to claim 4, wherein said engageable means comprise a pair of pivotably mounted arms, and rollers rotatably mounted on said arms rotatably engaging said side edges of said first cartridge and rotatably engaging said first, second and intermediate side edge sections of said second cartridge during said selective loading.

7. A device according to claim 6, wherein said biasing means comprises spring means biasing said arms in one pivotal direction to cause said rollers to biasingly engage said side edges of said first cartridge and said front, rear, and intermediate side edge sections of said second cartridge during said selective loading.

8. A device according to claim 2, wherein said cartridge guiding and loading means further comprises a top plate member and a pair of side wall members, said first and second cartridges being disposed between said pair of side wall members and underlying said top plate member when said first and second cartridges are in said loaded position.

9. A device according to claim 8, wherein said first cartridge has side edges extending in the direction of cartridge insertion, said front and rear portions of said second cartridge having respective front and rear side edge sections extending in the direction of cartridge insertion and an intermediate side edge section between the respective front and rear side edge sections, said intermediate side edge section extending at an acute angle relative to said front and rear side edge sections, said engageable means comprises a pair of arms pivotably mounted on said top plate, said biasing means biasing said pivotably mounted arms, said engageable means further comprising rollers rotatably mounted on said arms rotatably and biasingly engaging said side edges of said first cartridge and rotatably and biasingly engaging said first, second, and intermediate side edge sections of said second cartridge during said selective loading.

10. A device according to claim 8, wherein said biasing means comprises leaf springs and said engageable means comprises pressing members.

11. A device according to claim 10, wherein said pressing members have a tapered edge which tapers toward the disk cartridge in the insertion direction.

12. A device according to claim 10, wherein said leaf springs are connected to said side walls, said side walls having openings for said pressing members such that said pressing members can move back and forth in said openings.

13. A device according to claim 10, wherein said leaf springs are connected to said top wall, said top wall having openings for said pressing members such that the latter can move back and forth in said openings.

14. A device according to claim 13, wherein said first and second portions of said second cartridge have a different thickness.

15. A device according to claim 1, wherein said guide means comprises engageable means engageable with said first and second cartridges during said selective loading and moveable between said first and second positions in a plane generally parallel to the general plane of the first and second cartridges when the latter are being selectively loaded.

16. A device according to claim 1, wherein said guide means comprises engageable means engageable with said first and second cartridges during said selective loading and moveable between said first and second positions in a plane generally perpendicular to the general plane of the first and second cartridges when the latter are being selectively loaded.

17. A device according to claim 1 further comprising sensor means for detecting whether said first or second cartridge is loaded into the device.

* * * * *